United States Patent [19]
Gordon et al.

[11] 3,853,508
[45] Dec. 10, 1974

[54] APPARATUS FOR BAG COLLECTION OF DIRT

[75] Inventors: Mack Gordon, Medina; John F. Phillippi, Mentor, both of Ohio

[73] Assignee: Aerodyne Development Corporation, Cleveland, Ohio

[22] Filed: June 14, 1972

[21] Appl. No.: 262,660

Related U.S. Application Data

[63] Continuation-in-part of Ser. No. 186,373, Oct. 4, 1971.

[52] U.S. Cl.................. 55/302, 55/341, 55/379, 55/380, 55/381
[51] Int. Cl............................................. B01d 46/04
[58] Field of Search...... 55/302, 341, 379, 380–382, 55/487

[56] References Cited
UNITED STATES PATENTS

| | | | |
|---|---|---|---|
| 2,758,671 | 8/1956 | Silverman et al. | 55/484 |
| 2,800,194 | 7/1957 | Peek | 55/380 |
| 3,092,479 | 6/1963 | Hedberg | 55/380 |

FOREIGN PATENTS OR APPLICATIONS

| | | | |
|---|---|---|---|
| 2,094,635 | 2/1972 | France | 55/341 |

*Primary Examiner*—Bernard Nozick
*Attorney, Agent, or Firm*—Baldwin, Egan, Walling & Fetzer

[57] ABSTRACT

A method and apparatus for collection of dirt particles utilizes two fluid permeable filter media, one within the other, at least one of which is of porous flexible material. A dirty stream of fluid passes downstream through both filter media, after which the clean stream of fluid is discharged. The dirt collected on the upstream surface of the flexible bag is separated to fall downwardly by introducing against the downstream surface of the flexible bag sufficient fluid pressure to cause at least partial collapse of the bag whereby the collected dirt is removed mechanically by the movement of the bag and also by movement of the pressurized fluid in a reverse direction through the bag.

3 Claims, 10 Drawing Figures

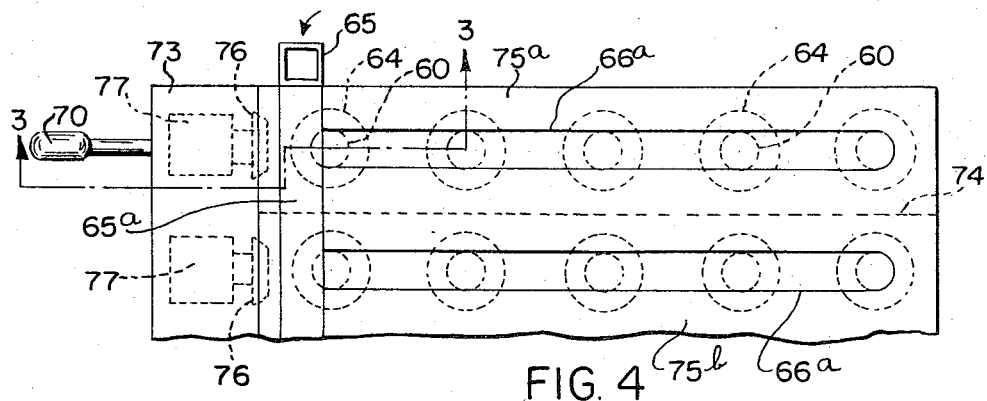
FIG. 4
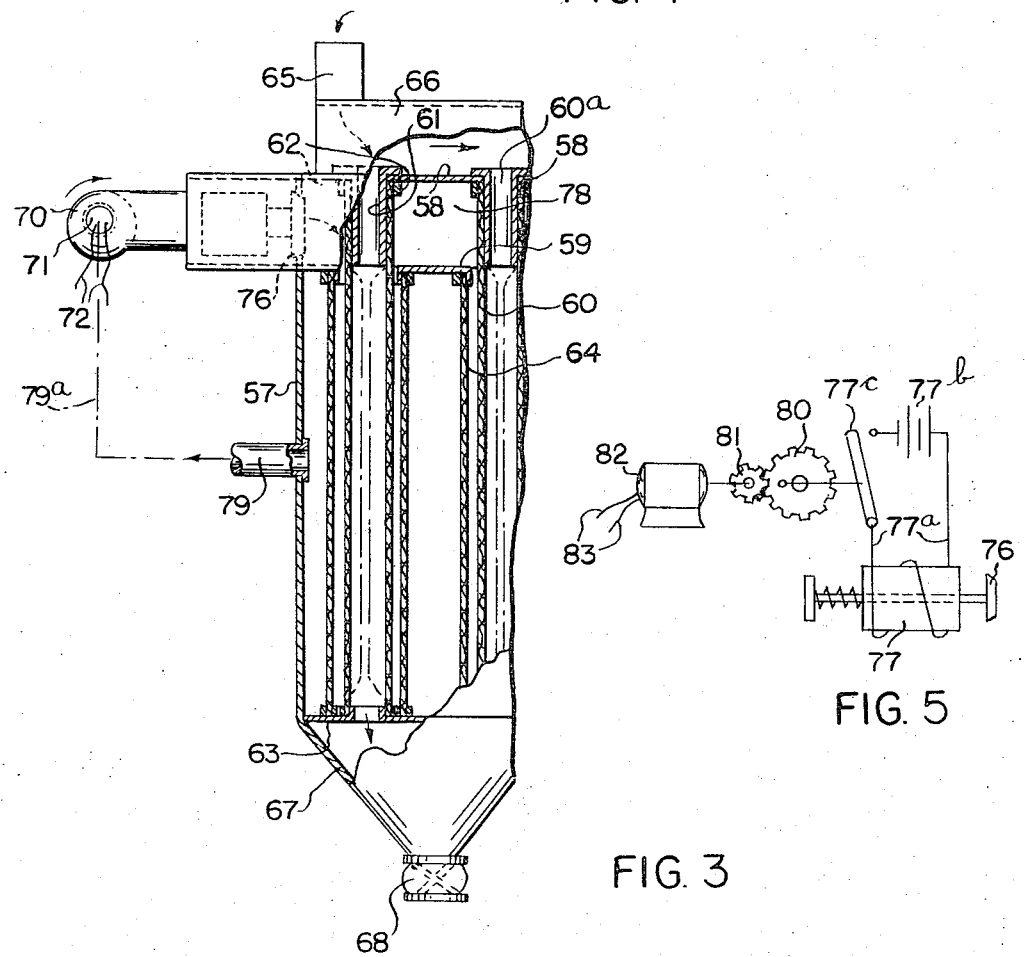
FIG. 3
FIG. 5

APPARATUS FOR BAG COLLECTION OF DIRT

This application is a continuation-in-part of our co-pending application Ser. No. 186,373, filed Oct. 4, 1971 for Method and Apparatus for Bag Collection of Dirt.

The bag collection of dust is old and various ways have been utilized to release the dirt once it was collected on the bag. In some cases the prior art used compressed air to dislodge the collected dust from the bag surface which is expensive and dirty and involves moisture problems in connection with the compressed air. The present invention uses the fluid discharge from an ordinary blower or pump for cleaning purposes. In other prior art, the bag is supported on a metal structure and in dislodging the collected dirt from the surface of the bag, the bag moves repeatedly over the supporting structure which eventually wears out the bag. The present invention needs no such supporting structure, when the inner bag is the flexible member. Old prior art collected dust on the interior surface of the bag, which later was shaken to dislodge the collected dust, and this type of collection involved a low air to cloth ratio (cubic feet of air per square foot of cloth) which seldom surpassed three to one. The present invention goes to to an air to cloth ratio of five or six to one.

An object of the present invention is to provide an outer bag surrounding an inner bag with a simple supporting structure, with no need for separate compartments, and a simple method of cleaning the collected dirt from the inner surface of the inner bag by introducing fluid pressure between the bags, and is simple to operate. Also, the present invention is one which is fail-safe in case one of the two bags breaks, because the other bag in such a case prevents free escape of dirt as pollution.

Other objects and advantages of the present invention will be apparent from the accompanying drawings and description and the essential features will be set forth in the appended claims.

In the drawings,

FIG. 3 is a central sectional view of another modification of this invention taken along the line 3—3 of FIG. 4;

FIG. 4 is a top plan view of the apparatus shown in FIG. 3;

FIG. 5 is a diagrammatic showing of a means for causing pulsing of the blow-down pressurized fluid as it is applied between the inner and outer bags;

FIG. 9 is a central sectional view similar to FIG. 6 but showing a modification taken along the line 9—9 of FIG. 10; while

Figure 1:
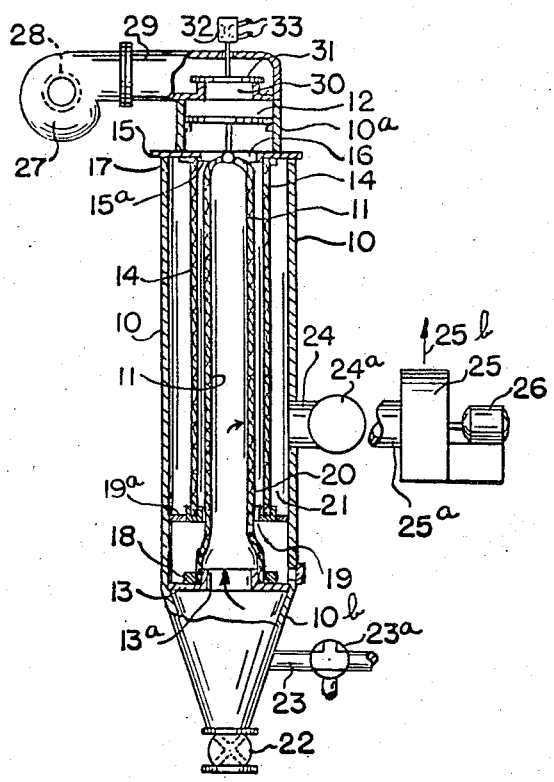
FIG. 1 is a central sectional view through a first embodiment of the present invention with the parts in dirt collecting postion. A space is shown between the bags for clarity.
Figure 2:
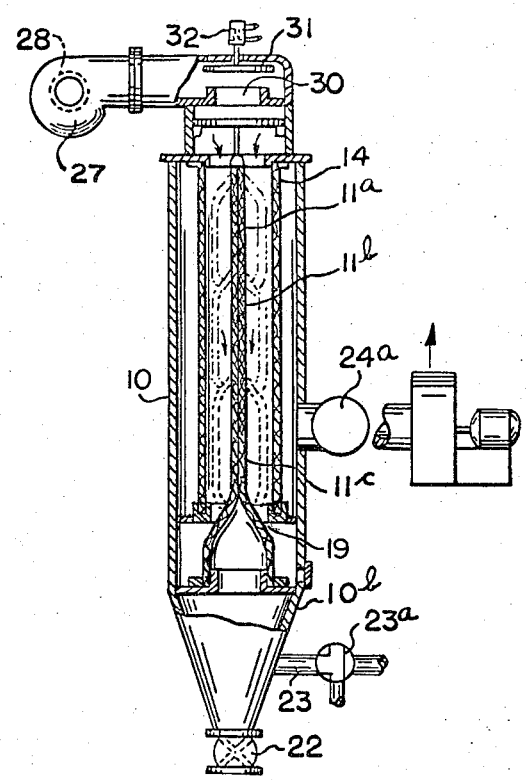
FIG. 2 is a similar view of the first embodiment showing the parts in dirt removal condition.

The first embodiment, shown in FIGS. 1 and 2, utilizes a housing 10 which, as shown, houses only a single bag collector, but in large installations one housing might contain a number of bag collectors as will presently appear. Within the housing is an elongated air-permeable bag element 11 which is closed at the top and is supported by being suspended from an arm 12 fixed in an upward extension 10a of the housing. The bag element 11 is open at the bottom where it is secured to an upstanding annular flange 13a of a partition 13 which otherwise closes off the bottom of the cylindrical portion of housing 10.

A second bag element 14 surrounds the bag 11 throughout substantially its entire length and is sealed at the top around a flange 15a of a plate 15 which otherwise closes the top of the cylindrical portion of the housing 10, outside of the opening 16 the purpose of which will presently appear. The bags 11 and 14 may touch or there may be a small space between them. An annular ring 17 holds the upper edge of bag 14 firmly in place against the flange 15a. At the bottom, a ring 18 holds bags 11 and 14 firmly against the flange 13a.

For a purpose which will later appear, it may be desirable in some cases to provide an opening 19 near the bottom of bag 14 supporting the lower end of bag 14 in a ring 19a supported from housing 10 on a plurality of arms to permit any dirt collecting in the annular chamber 20 between the bags to clear itself outwardly into the chamber 21 between the bag 14 and the cylindrical portion of the housing 10. When bag 11 collapses downwardly as shown in FIG. 2, any small amount of dirt between bags 11 and 14 is expelled at 19.

The housing has a hopper portion 10b at the bottom to receive dust collected on the interior surface of bag 11 and later discharged or removed by this invention to fall down into the hopper 10b. Means is provided at 22 at the bottom of the hopper 10b for removal of dust from the hopper. Shown in the drawings for this purpose is a well known rotary valve which allows removal of the dust without interfering with gas flow in the housing 10.

An inlet 23 is provided in the hopper 10b for the inlet of a stream of gas containing entrained dust particles in the direction of the arrow shown there. Preferable in some cases is the provision of a shut-off valve 23a for use when necessary.

An outlet for clean gas is provided at 24 communicating through the wall of the housing 10. In this case, there is shown a blower 25 driven by motor 26 which has its suction side connected at 25a to the clean gas outlet 24 and discharges the same at the outlet of the blower indicated at 25b. A valve is indicated at 24a for closing the clean gas outlet when desired.

Means is provided for intermittingly creating a pressurized gas differential between the bags 11 and 14 sufficient to cause at least a partial collapse of the inner bag 11, as indicated in FIG. 2, and forcing this pressurized gas through the inner bag radially inwardly, opposite to the dust collection direction of movement, so as to cause separation of the collected dust from the inner surface of the inner bag 11. This is shown in FIGS. 1 and 2 as a blower 27 driven by motor 28, whose controls are not shown but are of standard variety. A pipe 29 collects the discharge of the blower so as to guide the same into the extended portion 10a of the housing. To this end, an opening 30 leading into the extension 10a is normally closed by a valve 31 whose position is controlled by a device shown at 32 which is here shown as a cylinder and piston device having pressure fluid flow lines 33, although the device also might be a solenoid operated electrically.

The operation of the first embodiment should now be clear referring to FIGS. 1 and 2. A blower 27 is usually in continuous operation energized by the motor 28. When sufficient dust is collected on the inner surface of the inner bag 11 to require cleaning thereof, then the device at 32 is operated from the position of FIG. 1 to the position of FIG. 2 so as to open the valve 31, thus permitting the discharge from blower 27 to move downwardly through the opening at 30 and in the direction of the arrows, at the top of the bags, so as to apply pressure fluid from blower 27 between bags 11 and 14. Previous to this, if neccessay, depending upon the circumstances, valve 23a may be moved to the position of FIG. 2 and 24a may be closed. The operation proceeds serially from the top downwardly as shown in FIG. 2 with the upper part of the bag first collapsing at 11a so that both vertical sides of the bag substantially touch and air from the blower 27 penetrates inwardly through the walls of bag 11 both mechanically and pneumatically causing the collected dust to be loosened to fall downwardly. This collapse of the bag 11 occurs gradually from the top downwardly, being illustrated by steps at 11b and 11c which occur one after the other until the bag has been completely collapsed substantially to the bottom thereof. At any point in this action the uncollapsed part of bag 11 acts as a valve to cause most of the air from blower 27 to act against the collapsing portion. The dust discharged from bag 11 drops downwardly into the hopper portion 10b of the housing and is later removed as desired through the rotary valve 22, or otherwise.

The apparatus of FIGS. 1 and 2 could be operated in such a manner as to eliminate the cylindrical housing 10 and substitute therefor an open framework between the dust hopper 10b at the bottom and the structure 10a at the top which supports the valve 31 and the blower 27. This modified structure would provide the dirty stream of gas under pressure at 23 and the clean gas would be exhausted through the framework substituted for the cylindrical housing 10. Otherwise, such a modified structure would operate in the same manner as described with respect to FIGS. 1 and 2.

While the apparatus of FIGS. 1 and 2 have been described as used for collecting dust from a gas or air stream, it may also be used to remove dirt from a liquid stream under proper circumstances. In such use the blower 27 would be substituted by a liquid pump taking liquid from a clean source.

In the modification shown in FIGS. 3 and 4, a housing 57 supports an upper tube sheet 58 and a lower tube sheet 59. Suspended from the upper tube sheet is at least one upstream elongated permeable bag 60 which is a long tubular filter member supported from the upper tube sheet by an inner ring 61 and an outer ring 62, while inner and outer rings support the lower end of the bag on a bottom tube sheet 63. At least one elongated permeable filter medium 64 is supported from the lower tube sheet 59 by suitable inner and outer rings. This is also a long tubular permeable member concentric with and closely outside the bag 60. The member 64 is also fastened at the bottom to the bottom tube sheet 63. The inlet for the dirty air stream is indicated at 65 at the top and this comprises an inlet duct 66 communicating directly with the open upper end 60a of the upstream bag 60.

Means is provided for selectively opening and closing the area enclosed by the inner bag 60 at its lower end. In FIG. 3 this comprises a hopper 67 with sloping sides and closed at the lower end by a rotary sectional valve 68 which may be utilized to empty the hopper 67 when necessary.

Means is provided for intermittingly creating a fluid blow-down pressure between bag 60 and the filter medium bag 64. This comprises a blower 70 powered by electric motor 71 connected with an electrical circuit 72. The discharge from the blower passes into a blow-down manifold 73 and, where there are a plurality of pairs of filter members such as 60 – 64, a division wall 74 is provided between tube sheet 63 and tube sheet 58. This provides two chambers 75a and 75b. A control valve 76 is provided between the blow-down manifold 73 and each of the compartments 75a and 75b. These are controlled by individual solenoids 77, the control for which is standard and, therefore, not shown.

As best seen in FIG. 4, a plurality of the assemblies 60 – 64 are shown linearly arranged and vertically parallel and exactly like the single assembly explained in connection with FIG. 3. A cross duct 65a being part of the dirty air inlet communicates with parallel manifolds 66a, each of which communicates with its associated inner bags 60. The passageway 78 between the tube sheets 58 and 59, and divided by the division wall 74, communicates with the upper ends of all of the spaces between the permeable bags 60 and their associated permeable filter media 64.

It should be understood that means is provided for creating a pressure differential between the inlet 65 and the clean air outlet 79 to cause a dirt collecting fluid flow between them. In many cases, the dirty air stream at 65 is under pressure by a blower or other means, but it should be understood that a suction might be created at the clean air outlet 79 if the housing 75 otherwise completely enclosed the apparatus. With the dirt outlet 68 closed, the dirty air stream passes through the inlet duct 65 and 65a and along the manifolds 66a, entering the open upper ends of all of the inner bags 60, the flow is then radially outwardly through bags 60 and 64 to a clean air discharge. Where the purpose is to take dirt out of an air stream and allow it to escape to the atmosphere afterwards, then the housing 57 may be changed to an open framework for supporting the bottom tube sheet 63 and the control valve 68, thus not requiring a specific air discharge outlet as shown at 79. When the inner bag 60 is dirty, the blower 70 is placed in operation and one of the control valves 76 is opened to cause sufficient pressure between outer bag 64 and inner bag 60, as previously described, to cause collapse of the inner bag inwardly as shown in dot-dash lines in FIG. 3. The dirt is thus mechanically released while at the same time some of the blow-down air passes radially inwardly through the bag 60 to aid in cleaning the dirt from the interior thereof. In this manner, all of the bags connected by the passageway 75a, or alternatively the passageway 75, may be blown down and cleaned at the same time, if desired.

As shown in FIG. 3, blow-down air might come from atmosphere or a connection indicator at dot-dash line 79a might use some clean air from discharge outlet 79 for blow-down. All other embodiments shown herein could also use this feature.

The advantages of the modification shown in FIGS. 3 and 4 are that they may receive the dirty air stream from an elevated position, such as the top of a silo, and the entire cleaning bag assembly may be suspended in the air.

A pulsing action of the blow-down air stream is possible to increase the efficiency for displacing the collected dirt on the upstream side of the upstream bag. One means of doing this is illustrated in FIG. 5. The solenoid 77 of FIGS. 3 and 4 actuates the valve 76 which permits introduction of the blow-down air between the outer bag 64 and inner bag 60. An electrical circuit for operating the solenoid in a direction to open valve 76 is indicated at 77a and supplied with electrical power at 77b. An oscillating switch 77c serves to repeatedly open and close the circuit 77a. This switch is shown as being operatively connected by a crank 84 with an eccentric 84a on the rotatable gear 80 which meshes with a much smaller diameter pinion 81 which is driven by motor 82 which has a power source 83. The valve 76 is normally returned to open position by a tension spring 85. When a blow-down period arrives, the operator energizes the motor 82 at the same time that blower 70 is energized. Then the operation of oscillating switch 77c causes a pulsing of the blow-down air stream as it enters between bags 60 and 64 as previously described.

It should be understood that the pulsing means of FIG. 5, or the equivalent, may be arranged to pulse the solenoid 77 of FIGS. 3 and 4.

The description heretofore given shows a collapse of the inner bag as shown in FIG. 2 during the blow-down operation. Sometimes the diametrically opposite portions of the inner bag engage each other in a manner to hold the collected dirt between them. To obviate this difficulty, the construction shown in FIGS. 12 through 16 might be employed.

Figure 6:
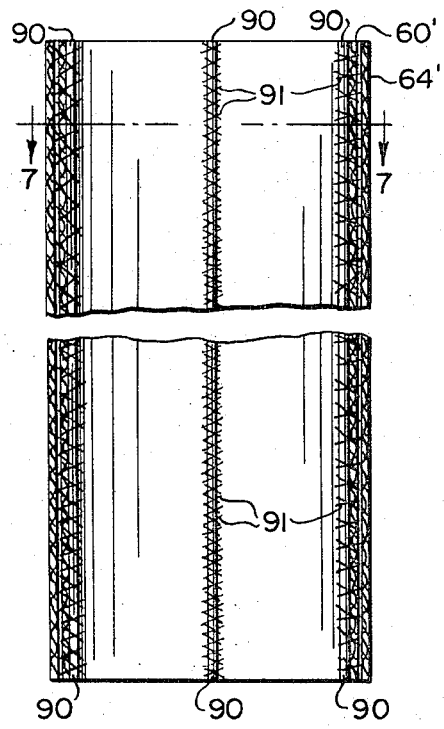
FIG. 6 is a central sectional view, enlarged, taken through a modification of the bags 60 and 64 as seen in FIG. 3.
Figure 7:
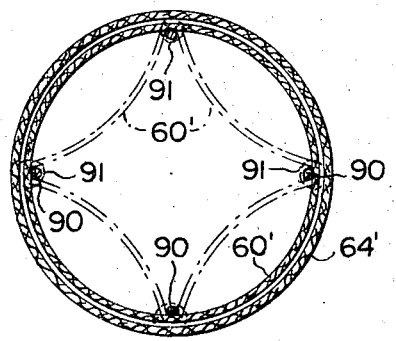
FIG. 7 is a sectional view taken along the line 7—7 of FIG. 6.
Figure 8:
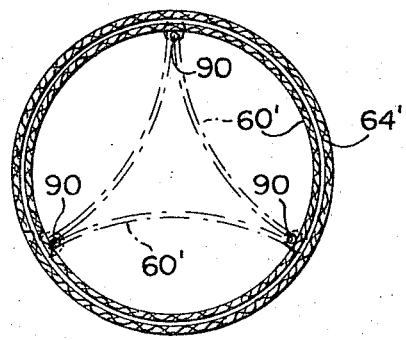
FIG. 8 is a central sectional view similar to FIG. 7 but showing a slight modification.

In FIGS. 6 and 7, there is shown inner bag 60' and outer bag 64' which perform the same functions as the bags 60 and 64 described in connection with FIGS. 3 and 4, in a similar structure. The modification shows bag support means holding relatively fixed at all times substantially linear longitudinally extending narrow zones of the inner bag. These zones are spaced around the inner bag circumferentially at a small number of points greater than two, four such points being shown in FIGS. 6 and 7, and three such points shown in FIG. 8. In FIGS. 6, 7 and 8, this bag support means includes taut members 90 which are held between flange 61 and collar 62 at the upper end of bag 60' and by a similar flange and collar arrangement at the tube sheet 63 at the bottom. These members 90 might be cords held very tightly or they might be metal rods. In any case, these taut members are secured along the longitudinally extending narrow zones of bag 60' by stitching 91.

Figure 9:
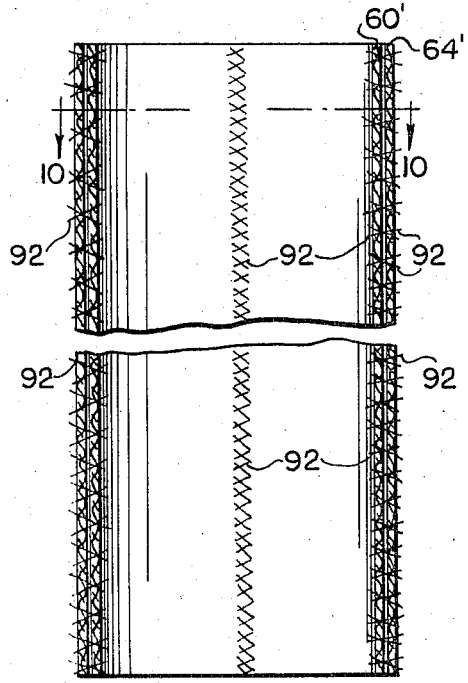
Figure 10:
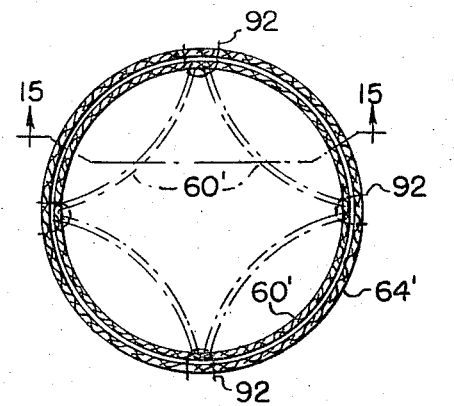
FIG. 10 is a sectional view taken along the line 10—10 of FIG. 9.

In FIGS. 9 and 10, the bag support means holding relatively fixed at all times substantially linear longitudinally extending narrow zones of the inner bag 60' are lines of stitching 92 which secure bag 60' to the outer bag 64' along the longitudinal lines indicated. During a blow-down operation, the outer bag 64' will not move very much and any movement thereof in that case would be outward anyway.

FIGS. 2, 8 and 10 illustrate in dot-dash lines approximately the position taken by the inner bag 60' which will swing inwardly in arcuate fashion being held at the spaced lines 90, 91 in FIGS. 7 and 8 or at spaced lines 92 as shown in FIG. 10. This would prevent dirt being held on the inner face of the inner bag such as might be possible with the construction shown in FIG. 2.

In every case, this invention provides a simple dust collecting apparatus having very few parts to wear out, quickly and easily cleaned, and having a favorable ratio between bag area and cubic feet of air handled.

Wherever "cloth" is used herein in the specification or claims, it means a porous, flexible fabric woven, felted, quilted, needled or knitted from any filament, or the equivalent.

Wherever "dirt" or "dirt particles" are referred to in the specification and claims, it is intended to include any finely divided particles which are desired to be removed from a fluid stream.

While certain filter media disclosed herein are bags of circular cross-section, they may be bags or sleeves of elliptical or other tubular cross-section.

What is claimed is:

1. Bag apparatus for use in a bag collector for dirt entrained in a fluid stream wherein an upstream inner bag and a downstream outer bag are concentric and closely adjacent; said apparatus comprising a housing, vertically supported in said housing, spaced inner and outer generally cylindrical fluid permeable bags, there being an inlet for dirty fluid stream in said housing and means connected with said inlet and an open end of an upstream bag communicating with the open end of said upstream bag, there being an outlet in said housing for clean fluid communicating with said housing and spaced downstream of said outer bag, means for creating a pressure differential between said inlet and said outlet to cause a dirt collecting fluid flow between them passing through said inner and outer bags in series, means in said housing and connected in flow communication with the space between said bags for intermittingly creating a fluid pressure between said bags sufficient to partially collapse said inner bag upstream whereby said dirt is collected from the inner surface of said inner bag; bag support means secured to said inner bag holding relatively fixed at all times substantially linear longitudinally extending narrow zones of said inner bag; said zones being spaced around said inner bag circumferentially at a small number of points greater than two, whereby blow-down fluid may be intermittingly introduced between said inner and outer bags to cause said inner bag to flex inwardly to release dirt from the inner surface of said inner bag at which time said bag support means is so constructed and arranged that said pressurized fluid cannot cause opposite sides of said inner bag to touch each other during said flexing.

2. Apparatus as defined in claim 1, wherein said last named bag support means comprises lines of stitching along said zones attaching said inner bag to said outer bag.

3. Apparatus as defined in claim 1, wherein said last named bag support means comprises taut means held by said housing and secured to said inner bag along said zones.

* * * * *